United States Patent
Choi

(10) Patent No.: US 10,349,336 B1
(45) Date of Patent: Jul. 9, 2019

(54) HIGH-RATE MULTIHOP NETWORK WITH BEAMFORMING

(71) Applicant: AIRSPACE INTERNET EXCHANGE LIMITED, Hong Kong (HK)

(72) Inventor: Thomas Kyo Choi, Los Angeles, CA (US)

(73) Assignee: AIRSPACE INTERNET EXCHANGE LIMITED, Hong Kong (HK)

( * ) Notice: Subject to any disclaimer, the term of this patent is extended or adjusted under 35 U.S.C. 154(b) by 0 days.

(21) Appl. No.: 15/893,732

(22) Filed: Feb. 12, 2018

(51) Int. Cl.
*H04W 88/04* (2009.01)
*H04W 40/22* (2009.01)
(Continued)

(52) U.S. Cl.
CPC .......... *H04W 40/22* (2013.01); *H04B 7/0404* (2013.01); *H04B 7/0617* (2013.01);
(Continued)

(58) Field of Classification Search
CPC ..... H04B 7/2606; H04B 7/155; H04W 88/04; H04W 16/26; H04W 84/047
See application file for complete search history.

(56) References Cited

U.S. PATENT DOCUMENTS 9,351,173 B2 * 5/2016 Giloh ................. H04L 12/4633
9,426,811 B2 * 8/2016 Kim ................... H04W 72/082
(Continued)

FOREIGN PATENT DOCUMENTS

CN 106162796 A 11/2016
CN 106304258 A 1/2017
(Continued)

OTHER PUBLICATIONS

Akül, F.O., and Sunay, M.O., "Enhancing 3G High Speed Wireless Data Performance Through Utilization of 3G—WLAN System Cooperation: A Cross-Network, Cross-Layer Approach," Wireless Personal Communications (2007), vol. 43, pp. 89-106.
(Continued)

*Primary Examiner* — Hassan A Phillips
*Assistant Examiner* — Prenell P Jones
(74) *Attorney, Agent, or Firm* — Spruson & Ferguson (Hong Kong) Limited

(57) ABSTRACT

A multihop network has nodes divided into user nodes, and base stations (BSs) each connected to a core network (CN). Each user node scans a surrounding area by an antenna array to identify a subset of the nodes wirelessly reachable by this user node and connectable to any BS. Node-specific information items determined for each reachable node include a farness value indicating farness in location between the reachable node and the user node. A target reachable node through which the user node communicates is selected and has a lowest farness value among the reachable nodes in the subset. The user node is communicable with a BS directly, or indirectly by multihop communication via the target reachable node, thereby allowing a total number of BSs adequate to support data communication between the CN and all the user nodes to be reduced when compared to non-multihop communication over the same geographical area.

18 Claims, 4 Drawing Sheets

(51) Int. Cl.
*H04W 40/12* (2009.01)
*H04B 7/0404* (2017.01)
*H04B 7/06* (2006.01)
*H04W 40/24* (2009.01)
*H04W 40/02* (2009.01)
*H04W 40/04* (2009.01)

(52) U.S. Cl.
CPC ......... *H04W 40/026* (2013.01); *H04W 40/04* (2013.01); *H04W 40/12* (2013.01); *H04W 40/246* (2013.01); *H04W 40/248* (2013.01); *H04W 88/04* (2013.01)

(56) References Cited

U.S. PATENT DOCUMENTS

| | | | | |
|---|---|---|---|---|
| 2007/0171852 | A1* | 7/2007 | George | H04W 88/06 370/328 |
| 2008/0031197 | A1* | 2/2008 | Wang | H04B 7/15542 370/331 |
| 2008/0274692 | A1* | 11/2008 | Larsson | H04B 7/15592 455/24 |
| 2012/0300694 | A1* | 11/2012 | Watanabe | H04W 16/32 370/315 |
| 2013/0102252 | A1* | 4/2013 | Rasmussen | H04K 1/04 455/41.2 |
| 2014/0148143 | A1* | 5/2014 | Choi | H04W 84/045 455/418 |
| 2015/0270888 | A1* | 9/2015 | Watanabe | H04W 16/32 370/315 |
| 2016/0204847 | A1 | 7/2016 | Ryu et al. | |
| 2017/0201858 | A1* | 7/2017 | Li | H04W 4/21 |
| 2017/0272972 | A1* | 9/2017 | Egner | H04W 28/0268 |
| 2017/0325243 | A1 | 11/2017 | Yasukawa et al. | |
| 2017/0331577 | A1* | 11/2017 | Parkvall | H04J 11/0079 |
| 2018/0184422 | A1* | 6/2018 | Cavalcanti | H04W 72/0446 |

FOREIGN PATENT DOCUMENTS

| | | |
|---|---|---|
| WO | 98/39936 A2 | 9/1998 |
| WO | 00/54539 A1 | 9/2000 |

OTHER PUBLICATIONS

Extended European Search Report of the corresponding EP patent application No. 18156273.7, dated Aug. 9, 2018.
International Search Report and Written Opinion of PCT application No. PCT/CN2019/073888 issued from the International Search Authority dated Mar. 27, 2019.

\* cited by examiner

HIGH-RATE MULTIHOP NETWORK WITH BEAMFORMING

FIELD OF THE INVENTION

The present invention generally relates to a wireless multihop network with beamforming. Particularly, the present invention relates to such network that reduces the number of base stations required to support all the nodes in a geographical area as well as that supports high-speed data transmission and link-failure resilience.

BACKGROUND

There is always a need to provide mobile communications and Internet connection to a large number of user terminals (UTs) scattered over a large geographical area, e.g., in rural areas. Although satellite communications are commonly considered a preferable option for supporting multi-user communications over the large geographical area, building a satellite communication system is not usually affordable. Alternatively, a terrestrial communication system is a more practically-affordable option. Nevertheless, it is required to install a considerable number of base stations (BSs) to support the UTs over the large geographical area, and each BS is usually a high-tower-based BS for covering a macro-cell having a diameter of, e.g., 30 km. Establishing such BS is costly. It is desirable and practically advantageous to have a communication technique such that the required number of BSs for supporting multi-user communications over the same geographical area can be reduced or minimized.

SUMMARY OF THE INVENTION

A method for operating a wireless multihop communication network is provided in the present invention. The network comprises plural nodes distributed over a geographical area. The nodes consist of one or more BSs and plural user nodes. The one or more BSs are connected to a core network (CN). Each of the nodes comprises an antenna array for adaptive beamforming. Operation details of an individual user node in accordance with embodiments of the method are described in the forthcoming paragraphs. The present invention also provides the network where each of the user nodes is configured to execute according to any of the embodiments disclosed herein regarding the operation details of the individual user node.

The individual user node scans a surrounding area around the individual user node by the antenna array thereof to identify a subset of the nodes. Each node in the subset is a reachable node wirelessly communicable with the individual user node, and is connectable to the CN through communication with at least one BS directly, or indirectly via a route including at least one other user node in between.

The individual user node determines a plurality of node-specific information items for an individual reachable node in the subset. The node-specific information items include a farness value for indicating a degree of farness in location between the individual reachable node and the individual user node.

The individual user node then selects a target reachable node such that data communication between the individual user node and the CN is made through the target reachable node. The target reachable node is selected from the subset of the nodes and has a lowest farness value among one or more reachable nodes in the subset such that when all the one or more BSs are not directly communicable with the individual user node, the individual user node is still communicable with the CN by multihop communication to at least one BS via the target reachable node. Thereby, a total number of the one or more BSs adequate to support data communication between the CN and all the user nodes is allowed to be reduced when compared to a scenario of not using multihop communication over the same geographical area.

When the individual user node has data to be forwarded to the CN, the individual user node configures the antenna array thereof to point to the target reachable node and thereafter sends the data to the target reachable node.

Preferably, the individual user node periodically repeats the scanning of the surrounding area to update the subset, the determining of the plurality of node-specific information items for each reachable node in the subset after updating, and the updating of the selected target reachable node.

When the target reachable node fails to receive the data sent from the individual user node due to a link failure, preferably the individual user node updates the subset by discarding the target reachable node so as to select a next target reachable node, reconfigures the antenna array of the individual user node to point to the next target reachable node, and resends the data to the next target reachable node. As a result, the network is made failure-resilient and self-healing.

In one embodiment, the node-specific information items further include an available-capacity value for indicating an available data-transmission capacity supported by the individual reachable node. When the subset has plural reachable nodes having the same lowest farness value, the individual user node selects the target reachable node from said plural reachable nodes with a highest available-capacity value.

In another embodiment, the node-specific information items further include a node-mobility value for indicating a traveling speed of the individual reachable node. When the subset has plural reachable nodes having the same lowest farness value, the individual user node selects the target reachable node from said plural reachable nodes with a lowest node-mobility value.

In an additional embodiment, the node-specific information items further include a link-recency value for indicating how recent the individual reachable node is communicated with the individual user node. When the subset has plural reachable nodes having the same lowest farness value, the individual user node selects the target reachable node from said plural reachable nodes with a highest link-recency value.

Preferably, the data sent to the target reachable node are packetized as datagrams according to an IP protocol such that routing of data during transmission between the target reachable node and the CN is made transparent to the individual user node. It relieves the individual user node from a burden of handling link-failure events during data transmission between the target reachable node and the CN. The datagrams may be IPv6 datagrams.

Other aspects of the present invention are disclosed as illustrated by the embodiments hereinafter.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In building a multi-user communication system over a large geographical area, it is required to set up a number of BSs and install a high-rate fiber backhaul network for connecting these BSs to a CN. The BSs are usually high-tower-based ones for collectively covering the large geographical area. Installation of the BSs is both time-consuming and costly. Furthermore, the cost of installing the fiber backhaul network generally increases as the number of BSs is increased. Reducing the number of BSs in a multi-user communication system without sacrificing the number of users that can be supported over the geographical area is always desirable in reducing the time and cost in setting up the communication system. The inventors have found that a combination of multihop communication and beamforming enables reduction of the number of BSs for supporting multi-user communications over the same geographical area when compared to conventional cellular mobile communication techniques, as elaborated as follows.

The following definitions are used herein in the specification and appended claims. "A node" means a radio station capable of transmitting and receiving wireless messages. "A base station" is a node that is connectable to a CN (core network). An example of CN is Evolved Packet Core of a mobile communication system. The CN usually provides access to the Internet. Usually, a BS is operated by a mobile communication service provider. "A user node" is a node that is not a BS. Usually, a user node is a communication device that uses services provided by the mobile communication service provider by communicating with BSs operated by this provider. The user node may be stationary, e.g., a radio station installed in a residential house, or mobile, e.g., a smartphone.

The present invention provides a wireless multihop communication network having an advantage of reducing the number of BSs used for supporting user nodes in a geographical area when compared to a communication system not using multihop communication. The present invention also provides a method for operating this network.

Figure 1:
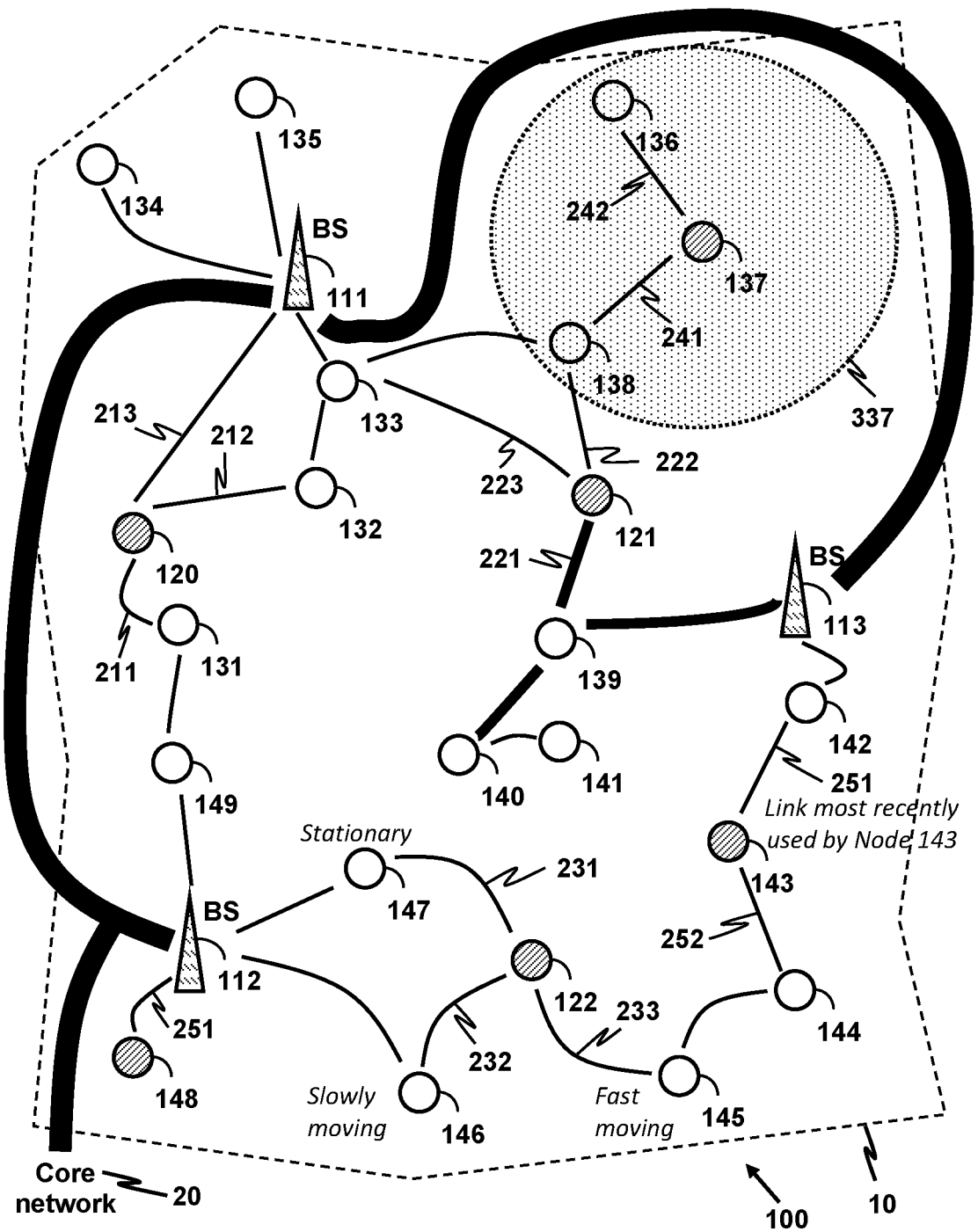
FIG. 1 depicts a wireless multihop communication network in accordance with an exemplary embodiment of the present invention.

FIG. 1 depicts a wireless multihop communication network 100 in accordance with an exemplary embodiment of the network as disclosed herein in the present invention. The network 100 comprises plural nodes 111-113, 120-122, 131-149 distributed over a geographical area 10. All the nodes 111-113, 120-122, 131-149 are divided into BSs 111-113 and plural user nodes 120-122, 131-149. In particular, the BSs 111-113 are connected to a CN 20. Although three BSs are depicted in FIG. 1 for illustrating the present invention, the present invention is not limited to this number of BSs, and is only required to have at least one BS. Particularly, each of the nodes 111-113, 120-122, 131-149 has an antenna array for adaptive beaming.

Figure 2:
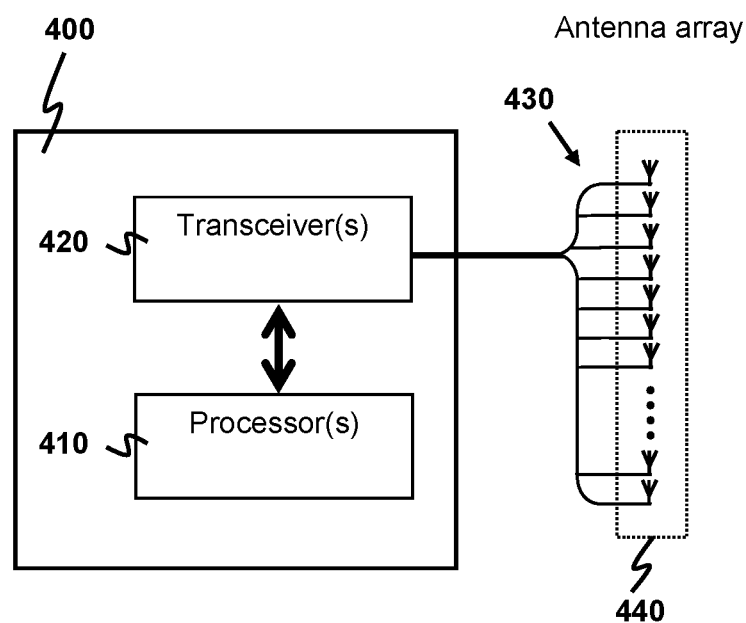
FIG. 2 depicts a schematic diagram of a node, which may be a BS or a user node.

FIG. 2 is a schematic diagram for exemplarily illustrating a structure of an individual node 400, which is any one of the nodes 111-113, 120-122, 131-149. An antenna array 430 of the individual node 400 includes multiple antenna elements 440 for performing adaptive beaming. To point a radio beam to a particular direction or to a desired node, one or more processors 410 are used to compute a signal gain for each of the antenna elements 440. Based on the computed signal gains, one or more transceivers 420 are used to generate a radio signal pointing to the particular direction. By having a highly focused radio beam, interference to other nodes not in the aforesaid particular direction is minimized. It follows that communication links among all the nodes 111-113, 120-122, 131-149 of the network 100 are more easily established. This advantage is utilized to make the network 100 feasible to be formed and feasible to be operated. Furthermore, focusing the beam to the desired node makes better use of the radio power in the signal, thereby enhancing the data-transmission rate under a given error probability. The network 100 is realizable for supporting high-rate data transmission.

Figure 3:
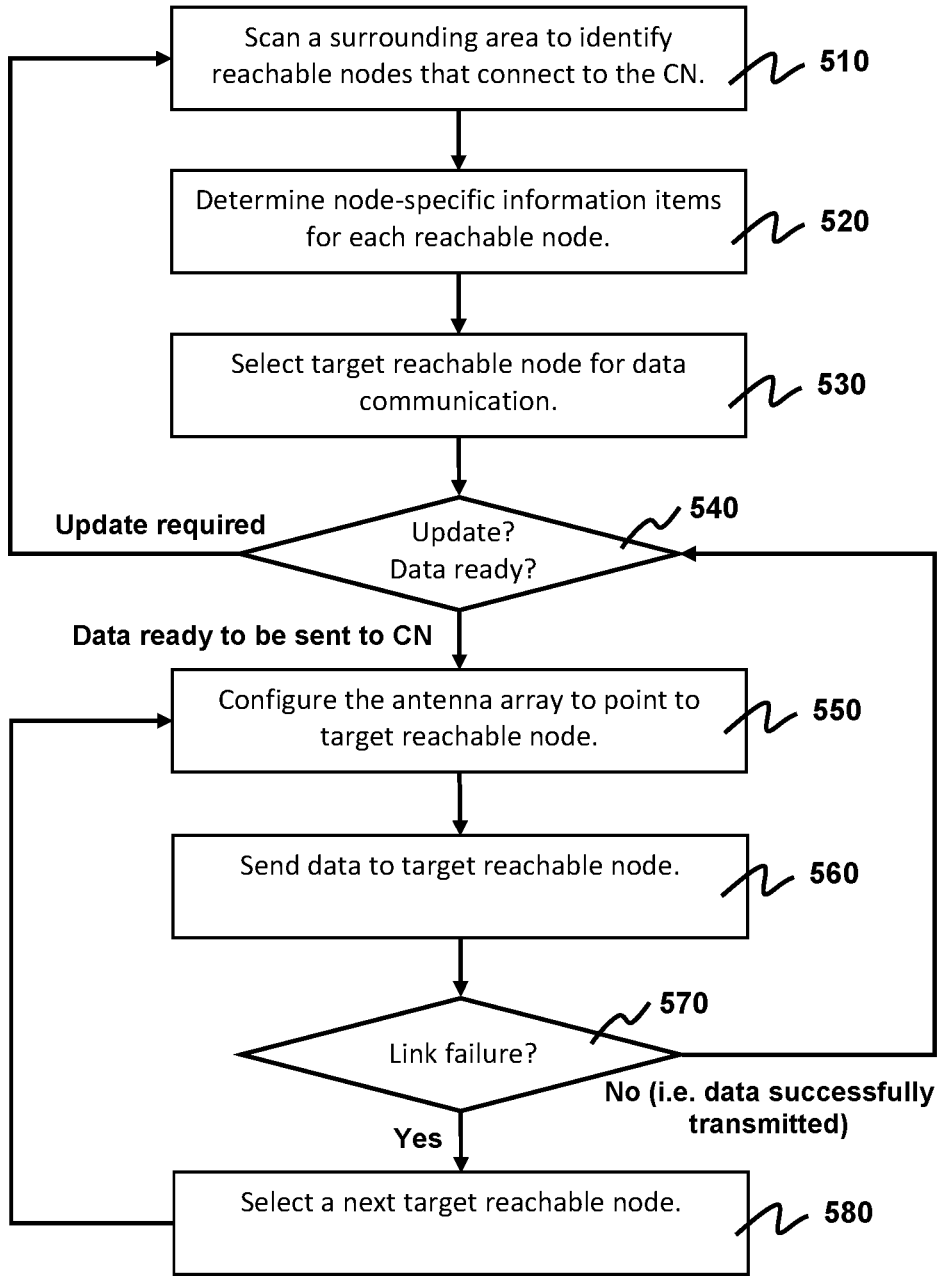
FIG. 3 depicts a flowchart for operating each user node in accordance with an exemplary embodiment of the present invention.

Operation details of an individual user node, which is one of the user nodes 120-122, 131-149, are described hereinafter with the aid of FIG. 3, which depicts a flowchart of operating the individual user node in accordance with an exemplary embodiment of the method for operating the wireless multihop communication network as disclosed herein in the present invention.

Steps 510, 520 and 530 relates to discovering any neighboring node and selecting a most suitable node by the individual user node.

In the step 510, the individual user node scans a surrounding area of the individual user node by the antenna array thereof to identify a subset of the nodes (including both BSs and user nodes). Each node in the subset is a reachable node wirelessly communicable with the individual user node, and is connectable to the CN through communication with at least one BS directly, or indirectly via a route including at least one other user node in between. Several examples are provided as follows with reference to FIG. 1. Note that in the absence of a direct line-of-sight path between a BS and the individual user node, direct communication between the BS and the individual user node is often not possible especially when high-rate data transmission is required, but indirect communication via one or more other user nodes is still possible. By using indirect, multihop communication, a coverage area provided by the BS for supporting data communication with user nodes therein is effectively enlarged.

Consider the user node 137 in a first example. The user node 137 has a scanning area 337 searchable by the antenna array of the user node 137, and the scanning area 337 is explicitly drawn on FIG. 1. Within the scanning area 337, neighboring nodes 136, 138 are identified. The neighboring nodes 136, 138 are directly communicable with the user node 137 through communication links 241, 242, respectively. Since the user node 136 is not connectable to any BS but the user node 138 is connectable to the BS 113 through a route comprising the user nodes 121, 139, the subset identified by the user node 137 contains only the user node 138 but not the user node 136.

In a second example, consider the user node 120. The user node 120 finds that neighboring nodes 131, 132, 111 are wirelessly reachable via communication links 211, 212, 213, respectively. The neighboring nodes 131, 132 are connectable to the BSs 112, 111, respectively. The neighboring node 111 is itself the BS 111. Hence, the subset as determined by the user node 120 contains the BS 111 and the user nodes 131, 132.

Consider the user node 148 in a third example. The user node 148 is connectable only to the BS 112 through communication link 251. Hence, the subset as identified by the user node 148 contains only the BS 112.

In the step 520, the individual user node determines a plurality of node-specific information items for an individual reachable node in the subset. Each of the node-specific information items contains data related to a particular aspect of the individual reachable node. The node-specific information items include at least a farness value for indicating a distance, or more generally a degree of farness in location, between the individual reachable node and the individual user node. In one embodiment, the farness value is determined according to a signal strength of a radio signal received by the individual user node and sent from the individual reachable node, provided that the individual user node is aware of the transmit power level of the radio signal. By estimating the distance between the individual user node and the individual reachable node based on the received signal strength and the transmit power level, the estimated distance may be used as the farness value. Alternatively, a ratio of the transmit power level to the received signal strength may also be used as the farness value.

Consider the aforementioned second example. For the user node 120, there are three reachable nodes 131, 132, 111 in the identified subset. On FIG. 1, it is drawn that the reachable node 131 is closest to the user node 120, the reachable node 132 is second closest and the reachable node 111 is farthest from the user node 120. The farness values are assigned for the purpose of ranking the reachable nodes 131, 132, 111 in their separations from the user node 120. Hence, the farness values for the reachable nodes 131, 132, 111 are assigned with values of 1, 2 and 3, respectively. The farness value of 1 indicates that the reachable node 131 is closest to the user node 120.

A physical distance between the individual user node and the identified reachable node can be accurately estimated if both nodes are equipped with Global Positioning System (GPS) location-determining devices and if the identified reachable node provides its location information to the individual user node. If it is not the case, the physical distance is usually not easy to be measured accurately, so that the measured distance is generally subject to a large variance. It may happen that there are more-than-one reachable nodes whose measured distances are too close such that the individual user node cannot decide with an acceptable confidence level which one of the reachable nodes is closer to the individual user node. In such case, the individual user node may assign the same farness value for these reachable nodes.

In the step 530, the individual user node selects a target reachable node such that data communication between the individual user node and the CN 20 is made through the target reachable node. The target reachable node is selected from the subset of the nodes and has a lowest farness value among one or more reachable nodes in the subset. Note that when all the BSs 111-113 in the network 100 are not directly communicable with the individual user node, the individual user node is still communicable with the CN 20 by multihop communication to at least one of the BSs 111-113 via the target reachable node. By this arrangement, a total number of BSs adequate to support data communication between the CN 20 and all the user nodes 120-122, 131-149 is advantageously reduced when compared to a scenario of not using multihop communication over the same geographical area 10.

Consider the second example again. The reachable node 131 has the lowest farness value among the three reachable nodes 131, 132, 111. Hence, the reachable node 131 is selected by the user node 120 as the target reachable node for making data communication with when the user node 120 has data to be sent to the CN 20.

As mentioned above, it is possible that more-than-one reachable nodes have the same farness value. Selecting the target reachable node based only on the farness values of these reachable nodes is not possible. In the step 530, preferably the individual user node determines the target reachable node among these plural reachable nodes, which have the same farness value, according to another node-specific information item.

Figure 4:
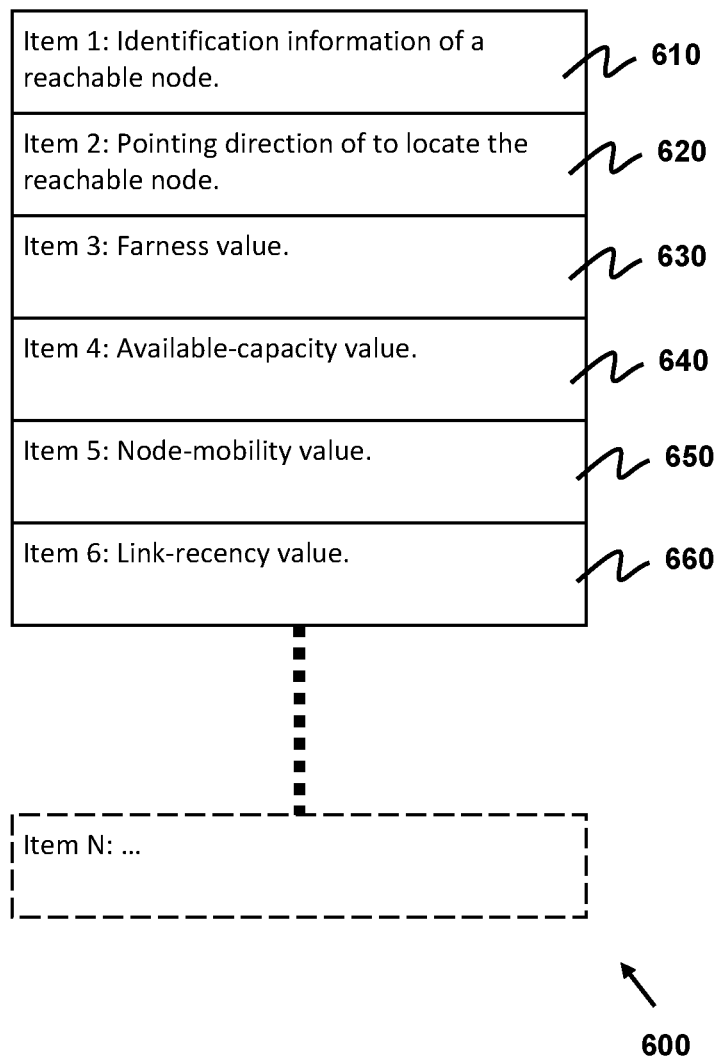
FIG. 4 provides one embodiment of a list of node-specific information items for each reachable node.

FIG. 4 provides one embodiment of a list 600 of node-specific information items for a reachable node identified by the individual user node. In the list 600, the reachable node's identification information 610 and a pointing direction 620 for the individual user node's antenna array to locate the reachable node are not usable for the purpose of selecting the target reachable node. Apart from a farness value 630, other node-specific information items usable for selecting the target reachable node include an available-capacity value 640, a node-mobility value 650 and a link-recency value 660.

The available-capacity value 640 is an indication of an available data-transmission capacity supported by the individual reachable node. The size of this capacity is usually transmitted from the reachable node under consideration to the individual user node upon initial set-up. This capacity is used by the individual user node to determine the available-capacity value 640. In addition, the available-capacity value 640 may be determined by taking into consideration additional factors such as a loading condition experienced by the reachable node, a traffic condition of a part of the network 100 involved in transmitting the data from the reachable node and the CN 20, etc. A higher available-capacity value indicates that this reachable node has more data-transmission capacity or more bandwidth when the individual user node transmits data to this reachable node, and is therefore more preferable to be selected as the target reachable node. In one embodiment, when the subset of the nodes as determined in the step 510 has plural reachable nodes having the same lowest farness value, the individual user node selects the target reachable node from said plural reachable nodes with a highest available-capacity value in the step 530.

Consider the user node 121 in a fourth example. The user node 121 finds that neighboring nodes 139, 138, 133 are wirelessly reachable via communication links 221, 222, 223, respectively. The neighboring nodes 133, 138 are connectable to the BS 111. The neighboring node 139 is connectable to the BS 113. Hence, the subset as determined by the user node 121 contains the user nodes 139, 138, 133. On FIG. 1, it is drawn that the two reachable nodes 138, 139 have similar distances from the user node 121, and are closer to the user node 121 than the other reachable node 133 is.

Hence, the user node 121 assigns the two reachable nodes 138, 139 with the same farness value of 1 whereas the reachable node 133 is assigned with a higher farness value of 2. Furthermore, it is seen from FIG. 1 that the communication link 221 has a higher data-transmission rate than the other two communication links 222, 223. Hence, the user node 121 assigns available-capacity values of 2, 1, 1 to the reachable nodes 139, 138, 133, respectively. In the selection of target reachable node by the step 530, the two reachable nodes 139, 138 are first selected to be candidates as they have the same lowest farness value of 1. Among the two candidates, the reachable node 139 is selected to be the target reachable node since this node has the available-capacity value (namely, 2) higher than the corresponding available-capacity value (namely, 1) of the reachable node 138.

The node-mobility value 650 is an indication of a traveling speed of the individual reachable node. The individual user node may determine this value according to the type of reachable node. For example, the reachable node may be a residential house, which is stationary, or a smartphone, which is mobile. It is quite easy to understand that a reachable node traveling in a lower speed is more preferable for the individual user node to send data. The node-mobility value 650 is assigned such that a lower value indicates that the traveling speed of the reachable node is lower. In one embodiment, when the subset of the nodes as determined in the step 510 has plural reachable nodes having the same lowest farness value, the individual user node selects the target reachable node from said plural reachable nodes with a lowest node-mobility value in the step 530.

Consider the user node 122 in a fifth example. The user node 122 finds that neighboring nodes 145, 146, 147, which are wirelessly reachable via communication links 233, 232, 231, respectively, are connectable to either the BS 113 or the BS 112. Hence, the subset as determined by the user node 122 contains the user nodes 145, 146, 147. Also, all the reachable nodes 145, 146, 147 are similar in distance from the user node 122 (as seen from FIG. 1). Hence, all the three reachable nodes 145, 146, 147 are assigned with the same farness value of 1. It is also seen from FIG. 1 that the reachable node 147 is stationary, the reachable node 146 is slowly moving and the reachable node 145 is fast moving. Hence, the reachable nodes 147, 146, 145 are assigned with node-mobility values of 1, 2, 3, respectively. In the selection of target reachable node by the step 530, since the reachable node 147 has the lowest node-mobility value among the three reachable nodes 145, 146, 147, the reachable node 147 is selected as the target reachable node.

The link-recency value 660 is an indication of how recent the reachable node under consideration is communicated with the individual user node. Generally, a first communication link that was more-recently used than a second communication link is expected to be more likely to remain usable than the second communication link. Therefore, the link-recency value 660 assigned by the individual user node may be higher for a first reachable node having the first communication link than for a second reachable node having the second communication link. In one embodiment, when the subset of the nodes as determined in the step 510 has plural reachable nodes having the same lowest farness value, the individual user node selects the target reachable node from said plural reachable nodes with a highest link-recency value in the step 530.

Consider the user node 143 in a sixth example. The user node 143 finds that neighboring nodes 142, 144, which are wirelessly reachable via communication links 251, 252, respectively, are connectable to either the BS 113 or the BS 112. Hence, the subset as determined by the user node 143 contains the user nodes 142, 144. Also, the two reachable nodes 142, 144 are similar in distance from the user node 143 (as seen from FIG. 1). Hence, the two reachable nodes 143, 144 are assigned with the same farness value of 1. Suppose that the link 251 is most recently used by the user node 143 for data communication. Hence, the reachable node 142 is assigned with a link-recency value of, say, 5 while a lower link-recency value of 1 is assigned to the reachable node 144. Note that the link-recency value is generally a time-variant value. For example, the link-recency value of the reachable node 142 drops step-by-step to zero as time passes unless the communication link 251 is reactivated for data communication. In the selection of target reachable node by the step 530, since the reachable node 142 has a higher link-recency value than the reachable node 144 does, the reachable node 142 is selected as the target reachable node.

Since some of the user nodes 120-122, 131-149 may move, making the network 100 dynamically changing over time, it is possible that the target reachable node as identified earlier is no longer the closest to the individual user node. Preferably, the steps 510, 520, 530 are repeated periodically in order to update the selected reachable node. In a step 540, when the target reachable node is required to be updated, e.g., after an expiration duration is passed, the steps 510, 520, 530 are redone. Those skilled in the art will appreciate that the expiration duration may be determined according to actual situations. For example, the network 100 may collect events of failure in establishing a link with the target reachable node. In each failure event, a time difference between time of accomplishing the step 530 and time of actually making data communication with the target reachable node is recorded. The network may make statistical analysis on the recorded time differences of all failure events to determine an appropriate expiration duration.

When the individual user node has data to be forwarded to the CN 20 (as checked in the step 540), the individual user node configures the antenna array thereof to point to the target reachable node (step 550) and thereafter send the data to the target reachable node (step 560). The data sent from the individual user node may be originated from this individual node, or may be a result of relaying another user node's data received by the individual user node.

Preferably, the data sent to the target reachable node are packetized as datagrams according to an IP protocol. It follows that routing of data during transmission between the target reachable node and the CN 20 is made transparent to the individual user node. It has an advantage that the individual user node is relieved from a burden of handling link-failure events during data transmission between the target reachable node and the CN 20. In one embodiment, the datagrams may be IPv4 or IPv6 datagrams.

It is possible that the communication link between the individual user node and the target reachable node actually fails at the time of sending the data from the individual user node to the target reachable node. When the target reachable node fails to receive the data sent from the individual user node due to a link failure (step 570), the individual user node performs a step 580 for re-establishing a connection with the CN 20. In the step 580, the individual user node updates the subset of the nodes by discarding the target reachable node. Then a next target reachable node is identified by a procedure similar to the step 530. After the next target reachable node is identified, the individual user node reconfigures the antenna array thereof to point to the next target reachable node (by redoing the step 550). The data are resent to the next target reachable node (by redoing the step 560). As a result, the network 100 embodies the advantage of being failure-resilient and self-healing. The procedure of reselecting the target reachable node and resending the data is repeated until the data are successfully sent to the CN 20.

In the above-mentioned second example, suppose that link failure is detected when the data are sent from the user node 120 to the target reachable node 131. This target reachable node 131 is then discarded from the identified subset by the user node 120 to give an updated subset. The updated subset contains the two remaining reachable nodes 132, 111. Since the reachable node 132 has the farness value (namely, 2) lower than the corresponding farness value of the reachable node 111 (namely, 3), the reachable node 132 is selected as the next target reachable node for data transmission.

Note that in the network 100, each of the user nodes 120-122, 131-149 is configured to execute a process according to any of the embodiments disclosed above regarding the operation details of the individual user node.

The above-disclosed operation details of the individual user node are related to sending data from the individual user node to the CN 20 via one of the BSs 111-113. When the CN 20 or the BSs 111-113 receive datagrams from all the user nodes 120-122, 131-149, a map of the network 100 describing the network topology can be made up by a master BS selected from the BSs 111-113. The map is regularly updated and may be regularly sent to the user nodes 120-122, 131-149. Whenever the CN 20 has data to be forwarded to an intended user node selected from the user nodes 120-122, 131-149, all the user nodes 120-122, 131-149 are able to make use of the map to determine a route for transmitting the data from the CN 20 to the intended user node by techniques available in the art, e.g., U.S. Pat. Nos. 7,664,082 and 7,941,149.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A wireless multihop communication network comprising plural nodes distributed over a geographical area, the nodes consisting of one or more base stations (BSs) and plural user nodes, the one or more base stations (BSs) being connected to a core network (CN), each of the nodes comprising an antenna array for adaptive beamforming, wherein an individual user node is configured to:
   scan a surrounding area of the individual user node by the antenna array thereof to identify a subset of the nodes, wherein each node in the subset is a reachable node wirelessly communicable with the individual user node, and is connectable to the CN through communication with at least one BS directly, or indirectly via a route including at least one other user node in between;
   determine a plurality of node-specific information items for an individual reachable node in the subset, wherein the node-specific information items include a farness value for indicating a degree of farness in location between the individual reachable node and the individual user node;
   select a target reachable node such that data communication between the individual user node and the CN is made through the target reachable node, wherein the target reachable node is selected from the subset of the nodes and has a lowest farness value among one or more reachable nodes in the subset such that when all the one or more BSs are not directly communicable with the individual user node, the individual user node is still communicable with the CN by multihop communication to at least one BS via the target reachable node, thereby allowing a total number of the one or more BSs adequate to support data communication between the CN and all the user nodes to be reduced when compared to a scenario of not using multihop communication over the same geographical area; and
   when the individual user node has data to be forwarded to the CN, configure the antenna array of the individual user node to point to the target reachable node, and send the data to the target reachable node.

2. The network of claim 1, wherein the individual user node is further configured to:
   periodically repeat scanning the surrounding area to update the subset, determining the plurality of node-specific information items for each reachable node in the subset after updating, and updating the selected target reachable node.

3. The network of claim 1, wherein the individual user node is further configured to:
   when the target reachable node fails to receive the data sent from the individual user node due to a link failure, update the subset by discarding the target reachable node so as to select a next target reachable node, reconfigure the antenna array of the individual user node to point to the next target reachable node, and resend the data to the next target reachable node, thereby making the network failure-resilient and self-healing.

4. The network of claim 1, wherein the farness value is determined according to a signal strength of a radio signal received by the individual user node and sent from the individual reachable node.

5. The network of claim 1, wherein:
   the node-specific information items further include an available-capacity value for indicating an available data-transmission capacity supported by the individual reachable node; and
   the individual user node is further configured to, when the subset has plural reachable nodes having the same lowest farness value, select the target reachable node from said plural reachable nodes with a highest available-capacity value.

6. The network of claim 1, wherein:
   the node-specific information items further include a node-mobility value for indicating a traveling speed of the individual reachable node; and
   the individual user node is further configured to, when the subset has plural reachable nodes having the same lowest farness value, select the target reachable node from said plural reachable nodes with a lowest node-mobility value.

7. The network of claim 1, wherein:
the node-specific information items further include a link-recency value for indicating how recent the individual reachable node is communicated with the individual user node; and
the individual user node is further configured to, when the subset has plural reachable nodes having the same lowest farness value, select the target reachable node from said plural reachable nodes with a highest link-recency value.

8. The network of claim 1, wherein:
the data sent to the target reachable node are packetized as datagrams according to an IP protocol such that routing of data during transmission between the target reachable node and the CN is made transparent to the individual user node, relieving the individual user node from a burden of handling link-failure events during data transmission between the target reachable node and the CN.

9. The network of claim 8, wherein the datagrams are IPv6 datagrams.

10. A method for operating a wireless multihop communication network, the network comprising plural nodes distributed over a geographical area, the nodes consisting of one or more base stations (BSs) and plural user nodes, the one or more base stations (BSs) being connected to a core network (CN), each of the nodes comprising an antenna array for adaptive beamforming, the method comprising:
scanning, by an individual user node, a surrounding area of the individual user node by the antenna array thereof to identify a subset of the nodes, wherein each node in the subset is a reachable node wirelessly communicable with the individual user node, and is connectable to the CN through communication with at least one BS directly, or indirectly via a route including at least one other user node in between;
determining, by the individual user node, a plurality of node-specific information items for an individual reachable node in the subset, wherein the node-specific information items include a farness value for indicating a degree of farness in location between the individual reachable node and the individual user node;
selecting, by the individual user node, a target reachable node such that data communication between the individual user node and the CN is made through the target reachable node, wherein the target reachable node is selected from the subset of the nodes and has a lowest farness value among one or more reachable nodes in the subset such that when all the one or more BSs are not directly communicable with the individual user node, the individual user node is still communicable with the CN by multihop communication to at least one BS via the target reachable node, thereby allowing a total number of the one or more BSs adequate to support data communication between the CN and all the user nodes to be reduced when compared to a scenario of not using multihop communication over the same geographical area; and
when the individual user node has data to be forwarded to the CN, arranging the individual user node to configure the antenna array thereof to point to the target reachable node and thereafter send the data to the target reachable node.

11. The method of claim 10 further comprising:
periodically repeating, by the individual user node, the scanning of the surrounding area to update the subset, the determining of the plurality of node-specific information items for each reachable node in the subset after updating, and the updating of the selected target reachable node.

12. The method of claim 10 further comprising:
when the target reachable node fails to receive the data sent from the individual user node due to a link failure, arranging the individual user node to update the subset by discarding the target reachable node so as to select a next target reachable node, reconfigure the antenna array of the individual user node to point to the next target reachable node, and resend the data to the next target reachable node, thereby making the network failure-resilient and self-healing.

13. The method of claim 10 further comprising:
determining the farness value according to a signal strength of a radio signal received by the individual user node and sent from the individual reachable node.

14. The method of claim 10, wherein the node-specific information items further include an available-capacity value for indicating an available data-transmission capacity supported by the individual reachable node, and wherein the method further comprises:
when the subset has plural reachable nodes having the same lowest farness value, selecting, by the individual user node, the target reachable node from said plural reachable nodes with a highest available-capacity value.

15. The method of claim 10, wherein the node-specific information items further include a node-mobility value for indicating a traveling speed of the individual reachable node, and wherein the method further comprises:
when the subset has plural reachable nodes having the same lowest farness value, selecting, by the individual user node, the target reachable node from said plural reachable nodes with a lowest node-mobility value.

16. The method of claim 10, wherein the node-specific information items further include a link-recency value for indicating how recent the individual reachable node is communicated with the individual user node, and wherein the method further comprises:
when the subset has plural reachable nodes having the same lowest farness value, selecting, by the individual user node, the target reachable node from said plural reachable nodes with a highest link-recency value.

17. The method of claim 10, wherein:
the data sent to the target reachable node are packetized as datagrams according to an IP protocol such that routing of data during transmission between the target reachable node and the CN is made transparent to the individual user node, relieving the individual user node from a burden of handling link-failure events during data transmission between the target reachable node and the CN.

18. The method of claim 17, wherein the datagrams are IPv6 datagrams.

* * * * *